Dec. 9, 1952 A. B. LAKEY 2,621,090
THRUST BEARING
Filed Aug. 21, 1951
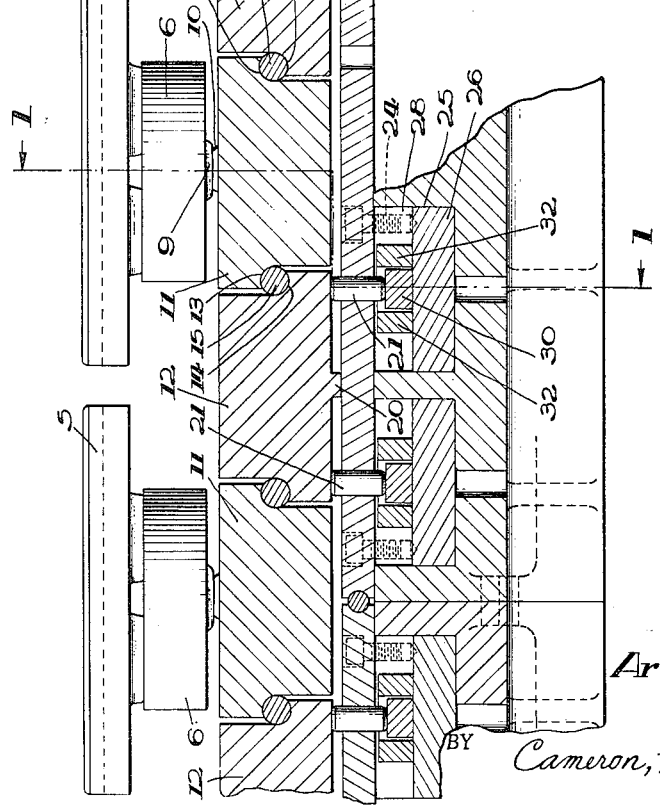
INVENTOR
*Arthur B. Lakey*
BY *Cameron, Kerkam & Sutton*
ATTORNEYS Patented Dec. 9, 1952

2,621,090

UNITED STATES PATENT OFFICE 2,621,090

THRUST BEARING

Arthur B. Lakey, Philadelphia, Pa., assignor to Kingsbury Machine Works, Inc., Philadelphia, Pa., a corporation of Delaware Application August 21, 1951, Serial No. 242,887

13 Claims. (Cl. 308—160)

1

This invention relates to thrust bearings of the type employing a plurality of tiltably mounted bearing shoes associated with means in the form of a series of bridged equalizing or "leveling" plates for equalizing the bearing pressure on the several shoes.

By way of example of a bearing of the type mentioned above, reference is made to Kingsbury Patent No. 1,421,695, granted July 4, 1922, and disclosing a ring-like series of bridged equalizing plates, the bearing shoes being tiltably mounted on alternate plates of the series and the intermediate plates of the series supporting said alternate plates and being themselves tiltably mounted on a suitable base structure. The bridging connection between the adjacent equalizing plates is made by radially disposed rollers so that the series constitutes a circumferentially flexible equalizing structure. The present invention will be described hereinafter with particular reference to such a bearing, but it can also be utilized in any other similar type of bearing.

In the operation of such a bearing, inequalities of pressure on the individual bearing shoes often tend to occur for well known reasons, and in such cases the bridged series of equalizing plates automatically adjusts itself in known manner to distribute the bearing pressure equitably between the several shoes. As a rule, the equalizing plates are left free to seek and assume their individual load-sustaining positions which may vary from time to time if the operating conditions change for any reason. In some cases, however, it is desirable that having once predetermined or equalized the load on the shoes, the equalizing plates should thereafter be held rigidly or fixed in their corresponding load-sustaining positions, the bearing shoes then being tiltably mounted on relatively rigid and unyielding supports.

It is an object of the present invention to provide novel means for holding the equalizing plates of a bridged series of the type described above substantially rigidly in their adjusted load-sustaining positions.

Another object is to provide means of the type characterized in the preceding object which can be employed with any equalizing plate type of bearing without material changes in the construction and design of the bearing shoes, equalizing plates and other parts of the bearing.

A further object is to provide novel means of the type characterized which can be set or locked quickly and easily in any position of the equalizing plates and which can be released with equal rapidity and ease in case it should be desirable

2 to readjust the positions of the equalizing plates or to permit the bearing to run with automatic load equalization in the usual manner.

A still further object is to provide such novel means which is strong and rugged in construction, which is built of relatively simple and few parts that are easy to manufacture and install, and which is also effective in service.

Other objects will appear hereinafter as the description of the invention proceeds.

The invention is capable of a variety of mechanical embodiments, one of which is illustrated in the accompanying drawings, but it is to be expressly understood that this embodiment is by way of example only and that the drawings are not to be construed as a definition of the limits of the invention, reference being had to the appended claims for this purpose.

In the drawing,

Fig. 1 is a fragmentary sectional view of a bearing embodying the invention, the section being taken on the line 1—1 of Fig. 2; and Fig. 2 is a fragmentary sectional view on the pitch circle of the equalizing plates of Fig. 1, but developed into a single plane for convenience of illustration.

The invention may be applied to any suitable service and may be embodied in thrust bearings of any suitable construction, size, number of bearing shoes, equalizing plates and the like, but it is of particular utility in bearings designed to sustain relatively heavy thrust loads. For purposes of illustration the drawings show an embodiment comprising a thrust bearing for a vertical shaft, but it will be understood that the invention may be embodied equally well in bearings for horizontal or inclined shafts and in double acting as well as single acting thrust bearings, etc. Moreover, the bridged series of equalizing plates may be of any type and construction known to the art, but for convenience is shown in the drawings as being of the type disclosed in the aforesaid Kingsbury patent.

In the form shown, the shaft 1 is indicated diagrammatically at the right-hand side of Fig. 1, and is provided in any suitable way with the usual thrust block 2 and a suitable thrust collar or runner 3. Cooperating with the bearing face 4 of the runner 3 are a suitable number of bearing shoes 5 of any suitable size and construction. As shown, the supporter base 6 of each shoe is disposed in an aperture 7 in any suitable stationary ring or cage 8 whereby the shoes are properly located and maintained in position.

Each bearing shoe is preferably mounted so that it may tilt both radially and circumferentially with respect to the axis of the bearing in conformity with the principle of the Kingsbury bearing, and to this end the supporting base 6 of each shoe is provided with a hardened projection 9 having a curved surface which engages the approximately flat surface of a hardened insert 10 in one of the equalizing plates described hereinafter.

A typical bridged series of equalizing plates is shown more clearly in Fig. 2. Referring to this figure, the shoes 5 are supported on alternate plates 11 of the series, each plate 11 being supported by adjacent intermediate plates 12 and connected thereto for relative tilting movement. As shown, opposed radial notches 13 and 14 are formed in the opposed faces of each pair of plates 11 and 12, and radially disposed rollers 15 are interposed between the notches 13 and 14. As will be understood from the aforementioned patent, this construction provides a ring-like series of bridged equalizing plates which are connected to one another for relative circumferential tilting movement and which together constitute a circumferentially flexible equalizing structure.

The intermediate equalizing plates 12 are each tiltably mounted on a suitable base ring or plate 16 which is preferably channel-shaped in cross section, being provided with inner and outer marginal flanges 17 and 18 respectively between which the series of equalizing shoes is retained. Preferably the base plate 16 and the shoe cage 8 are secured to one another in any suitable manner, and this may be accomplished in part by rabbeting the upper and lower edges respectively of the flange 18 and of the cage 8 as indicated at 19. The tilting mounting of each intermediate plate 12 on the base plate 16 is provided by a projection 20 extending from each equalizing plate into engagement with the base plate. These mountings may permit tilting of the intermediate equalizing plates both circumferentially and radially, but as a rule provision for circumferential tilting only is sufficient in which event the projections 20 may comprise radially disposed ribs as disclosed in the aforesaid patent.

It will be understood that when a bearing load is imparted to the shoes 5 by the runner 3, any inequalities of pressure on the individual shoes result in circumferential flexing of the bridged series of equalizing plates whereby the individual plates 11 and 12 may assume load-sustaining positions slightly inclined relative to one another so as to distribute the load equitably between the several shoes. Once such load-sustaining and equalizing positions have been established, and until there is some change in the conditions, it may be assumed that the equalizing plates should maintain their adjusted positions without further tilting movement. The present invention provides additional means for engaging the intermediate equalizing plates in such load-sustaining positions, said means being settable or lockable so as to hold said intermediate plates substantially rigidly and hence to prevent further tilting or flexing of the entire series of equalizing plates until the locking means is released.

It will be apparent that such additional means may take any of a number of mechanical forms, broadly speaking. In the preferred embodiment shown in the drawings, however, such means comprises a plurality of auxiliary supporting members movable into engagement with the lower faces of the intermediate equalizing plates 12 at points spaced circumferentially on both sides of their tiltable mountings 20 and thus preventing further tilting movement of said intermediate plates until said auxiliary supports are withdrawn. In the form shown in the drawings, said auxiliary supports take the form of thrust pins 21 movable through openings in the base plate 16 and projecting therefrom into engagement with the intermediate equalizing plates 12, one pin being located near each end of each intermediate equalizing plate substantially beneath one of the rollers 15.

Said pins may be moved into engagement with the intermediate equalizing plates or withdrawn therefrom by any suitable means mounted in a sub-base structure 22 of any suitable type and preferably comprising suitable cam means engaging the lower ends of the thrust pins and adjustable laterally of the base structure 22 in any suitable manner. Referring to the preferred construction shown in the drawings, the base ring or plate 16 is supported on the sub-base 22, being held in position thereon by suitable means such as a flange 23 and suitable screws 24 (Fig. 2). The sub-base 22 is provided with a recess 25 adjacent each thrust pin 21 to receive a block 26 which is preferably circular in shape and is secured in the proper position in its recess by suitable means such as one or more screws 27. The upper surface of each block 26 is recessed at 28 and the bottom 29 of the recess is inclined (Fig. 1) to receive a suitable wedge block 30 movable up the incline 29 and having a substantially horizontal top surface 31 on which the lower end of the pin 21 rests. The movement of the wedge 30 may be guided between suitable walls 32 and each block 26 is disposed in its recess so that the wedge moves in an approximately radial direction between the guides 32.

For adjusting the wedges 30, screws 33 extend through the sub-base 22 and through the upper part of the wedge block 26 into its recess 28, the inner ends of the screws 33 engaging the ends of the wedges 30. The outer ends of the screws 33 are squared or otherwise suitably shaped as indicated at 34 and rotate in recesses 35 in the sub-base 22. The screws may be fixed in adjusted position by suitable means such as locking plates 36 secured to the outer face of the sub-base 22 by means of screws 37.

It will be understood that the bearing is lubricated in any suitable manner, preferably running in a suitable oil well the construction of which has been omitted to simplify the illustration of the invention. An appropriate oil level has been indicated at 39 in Fig. 1.

In the use of the invention, the adjusting screws 33 are slacked off so that the equalizing plates 11 and 12 are free to seek and assume their load-sustaining positions under the bearing load applied to the shoes 5 by the runner 3. This may be done with the bearing stationary, with or without jacking the shaft 1 around a few turns, or simply by starting the bearing to run under normal conditions. At the desired time, the screws 33 are then set up to move the wedges 30 radially inward and tighten the auxiliary pins 21 against the intermediate equalizing plates 12 in supporting engagement therewith. The screws 33 are then locked by means of the locking plates 36, the setting of the equalizing plates 11 and 12 being thus preserved indefinitely. At any desired time, however, the screws 33 can be backed off to release the intermediate equalizing plates so that the bridged series of equalizing plates then re-assumes its circumferential flexibility and correction may be made for any misalignment that may have occurred or the bearing may be allowed to run in the normal manner.

It will be understood that the invention is not restricted to the embodiment particularly described above, and also that various changes may be made in the form, details of construction and arrangement of the parts without departing from its spirit. Reference should therefore be had to the appended claims for a definition of the limits of the invention.

What is claimed is:

1. In a thrust bearing, a plurality of thrust bearing members, means for equalizing the bearing pressure thereon comprising equalizing plates on which said bearing members are mounted and intermediate equalizing plates bridged by said first named equalizing plates and on which said first named equalizing plates are mounted to form therewith a circumferentially flexible equalizing structure, a base on which said intermediate equalizing plates are tiltably mounted, and intermediate plate locking means engaging said intermediate plates in load-sustaining position and settable to prevent tilting of said intermediate plates relative to said base.

2. In a thrust bearing, a plurality of thrust bearing members, means for equalizing the bearing pressure thereon comprising equalizing plates on which said bearing members are mounted and intermediate equalizing plates bridged by said first named equalizing plates and on which said first named equalizing plates are mounted to form therewith a circumferentially flexible equalizing structure, a base on which said intermediate equalizing plates are tiltably mounted, and locking means movable into engagement with said intermediate plates at points spaced circumferentially on both sides of their tiltable mountings for holding said intermediate plates in load-sustaining position and preventing tilting thereof relative to said base.

3. In a thrust bearing, a plurality of thrust bearing members, means for equalizing the bearing pressure thereon comprising equalizing plates on which said bearing members are mounted and intermediate equalizing plates bridged by said first named equalizing plates and on which said first named equalizing plates are mounted to form therewith a circumferentially flexible equalizing structure, a base on which said intermediate equalizing plates are tiltably mounted, and auxiliary supports movable into supporting engagement with said intermediate plates in their load-sustaining position and settable to fix said intermediate plates against tilting.

4. In a thrust bearing, a plurality of thrust bearing members, means for equalizing the bearing pressure thereon comprising equalizing plates on which said bearing members are mounted and intermediate equalizing plates bridged by said first named equalizing plates and on which said first named equalizing plates are mounted to form therewith a circumferentially flexible equalizing structure, a base on which said intermediate equalizing plates are tiltably mounted, and supports movable into supporting engagement with said intermediate plates at points spaced circumferentially on both sides of their tiltable mountings and settable to maintain said intermediate plates in load-sustaining position, said supports being adjustably mounted on and projecting from said base.

5. In a thrust bearing, a plurality of thrust bearing members, means for equalizing the bearing pressure thereon comprising equalizing plates on which said bearing members are mounted and intermediate equalizing plates bridged by said first named equalizing plates and on which said first named equalizing plates are mounted to form therewith a circumferentially flexible equalizing structure, a base on which said intermediate equalizing plates are tiltably mounted, locking means movable into engagement with said intermediate plates at points in their load-sustaining positions and settable to prevent tilting of said intermediate plates relative to said base, and cam means for moving said locking means into engagement with said intermediate plates.

6. In a thrust bearing, a plurality of thrust bearing members, means for equalizing the bearing pressure thereon comprising equalizing plates on which said bearing members are mounted and intermediate equalizing plates bridged by said first named equalizing plates and on which said first named equalizing plates are mounted to form therewith a circumferentially flexible equalizing structure, a base on which said intermediate equalizing plates are tiltably mounted, supports movable into supporting engagement with said intermediate plates at points spaced circumferentially on both sides of their tiltable mountings and settable to maintain said intermediate plates in load-sustaining position, said supports being adjustably mounted on and projecting from said base, and cam means on said base and engaging said supports for moving the latter into engagement with said intermediate plates.

7. In a thrust bearing structure, a plurality of thrust bearing members, means for equalizing the bearing pressure thereon, and a base plate on which said equalizing means is mounted, said equalizing means comprising a series of bridged equalizing plates connected for relative circumferential tilting movement, said thrust bearing members being mounted on alternate plates of the series and the intermediate plates supporting said alternate plates and being mounted on said base plate for tilting movement relative thereto, auxiliary intermediate plate supports projecting from said base plate, and means for moving said supports relative to said base plate into engagement with said intermediate plates, at least two circumferentially spaced supports being associated with each intermediate plate.

8. A thrust bearing as defined in claim 7, said support moving means comprising adjustable cams one for each of said auxiliary supports.

9. A thrust bearing as defined in claim 7, said support moving means comprising wedges movable to vary the extent of projection of said auxiliary supports from said base plate.

10. A thrust bearing as defined in claim 9, including wedge moving means adjustable approximately radially relative to said base plate.

11. In a thrust bearing structure, a plurality of thrust bearing members, means for equalizing the bearing pressure thereon comprising a series of bridged equalizing plates connected for relative circumferential tilting movement, said thrust bearing members being mounted on alternate plates of the series, a base comprising a base plate on which the intermediate plates of the series are tiltably mounted and a supporting base structure on which said base plate is mounted, auxiliary thrust pins projecting through openings in said base plate toward said intermediate plates at points spaced circumferentially on both sides of their tiltable mountings, and movable means on said base structure for engaging the ends of said pins and advancing them through said base plate to bring their other ends into engagement with said intermediate equalizing plates.

12. A thrust bearing as defined in claim 11, said pin advancing means comprising cam devices engaging said pins and cam adjusting means extending laterally from said base structure.

13. A thrust bearing as defined in claim 11, said cam devices comprising wedges movable in approximately radial directions, said base structure being recessed adjacent each pin for reception of a wedge, and wedge adjusting screws projecting through the recessed walls into engagement with said wedges.

ARTHUR B. LAKEY.

REFERENCES CITED

The following references are of record in the file of this patent:

UNITED STATES PATENTS

| Number | Name | Date |
|---|---|---|
| 2,102,534 | Howarth | Dec. 14, 1937 |
| 2,110,464 | Kingsbury | Mar. 8, 1938 |